May 5, 1953 — H. M. OLSON — 2,637,607

PISTON RING

Filed June 17, 1952

INVENTOR
HOLLY M. OLSON
BY Frank E. Livrance, Jr.
ATTORNEY

Patented May 5, 1953

2,637,607

UNITED STATES PATENT OFFICE 2,637,607

PISTON RING

Holly M. Olson, Muskegon, Mich., assignor to Sealed Power Corporation, Muskegon, Mich., a corporation of Michigan Application June 17, 1952, Serial No. 293,895

3 Claims. (Cl. 309—40)

The present invention relates to piston rings and is more particularly concerned with a novel one piece spacer and expander made from flat metal, interposed between upper and lower thin rails in an oil groove of a piston.

Such oil grooves have, at their bottoms and leading therefrom to the interior of the piston, passages for oil to return to the crankcase of the engine in which the piston is used, such oil being scraped and otherwise collected from the walls of the cylinder, and goes through the oil ring in the lowermost groove of the piston, for return to the interior of the piston and to the engine crankcase. Such oil rings, heretofore, have generally had continuous bottoms upon which corrugated expanders, located at the inner portions of the oil groove bear at spaced apart points, and at intermediate points against the inner edges of the steel rails to force them outwardly.

It has now become quite extensive practice that the lower ring grooves in a piston are cut entirely through the walls of the piston except at the wrist pin bosses of the piston, the ring grooves being completely open between said bosses. With such bottomless piston ring groove, the long used corrugated thin steel ribbon expander cannot function as there is nothing for it to bear against where it previously has pressed against the bottom of the piston ring groove.

My invention is directed to a simple, practical and effective, novel structure in a single member, which serves the purposes both of spacing and maintaining spaced the thin steel rails of a piston ring, and also acting against said rails at their inner curved edges to force them outwardly so that at their outer edges they bear with the necessary unit pressure against the walls of a cylinder in which installed.

An understanding of the invention may be had from the following description, taken in connection with the accompanying drawing, in which, Fig. 1 is a fragmentary plan view of a blank of flat metal, as it is stamped from ribbon stock, and from which the spacer and expander is formed.

Figure 6:
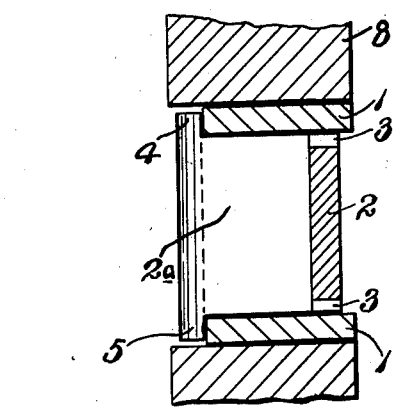
Figure 5:
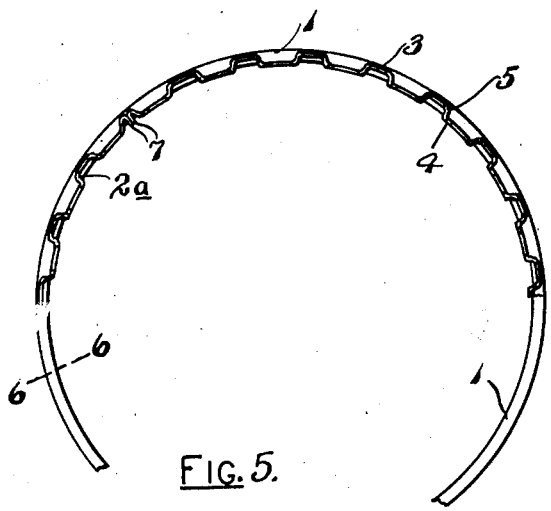

Fig. 5 illustrates the piston ring with which my invention is used in plan view, with a portion of the upper steel rail removed, and Fig. 6 is an enlarged vertical section through a piston at the lowermost oil groove thereof, the groove extending entirely through from the outer to the inner side of the piston, and with the assembled piston ring having the spacer and expander of my invention installed with the upper and lower rails in such groove, the plane of the section through the piston ring being substantially that shown by the line 6—6 of Fig. 5.

Like reference characters refer to like parts in the different figures of the drawing.

Upper and lower thin steel rails 1, each parted at one side in practice, are used in many piston rings held spaced from each other by a spacing member therebetween, which has venting passages for oil to pass therethrough to the bottom of the piston ring groove. Such rails in general are acted upon by a corrugated thin steel expander, alternate corrugations bearing against the bottom of the piston ring groove and against the rear edges of the rails.

Figure 1:
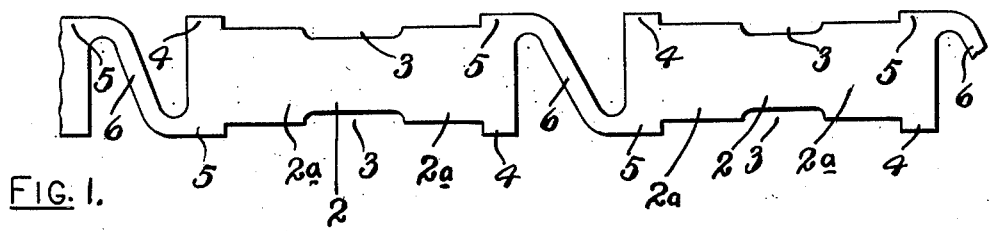
Figure 2:
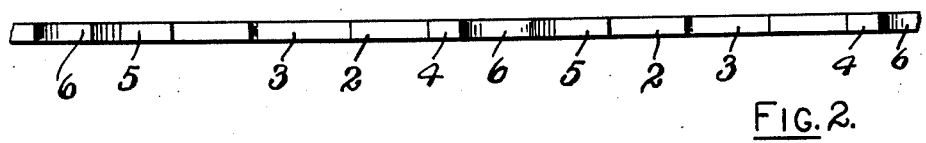
Fig. 2 is an edge view thereof.

With my invention, a novel construction of spacer is used which also acts to exert pressure against the inner edges of the rails, to force them outwardly. From a length of flat metal, sufficiently long to provide a complete spacer for the piston ring, at selected positions in the length thereof portions are cut away by suitable dies to leave successive shorter lengths 2 which have portions of the metal of the strip cut away at each side edge, so that the body of the sections 2 is narrower than the metal ribbon from which the spacer is made. Also midway between the ends of the sections 2 still further metal is removed to make shallow somewhat elongated recesses 3, one at each side of the section 2 leaving at each end of the narrow intermediate portion wider sections 2a. Also between the adjacent ends of each of the sections 2 opposite deep notches or recesses are cut. The wider portions 2 at the outer end of each part 2a, indicated at 4 and 5, remain after cutting away side edge portions of the sections 2 as described. The deep recesses cut in opposite sides of the ribbon stock leave a diagonally disposed tie 6 which connects the two portions 5 at adjacent ends and opposed sides of said sections as shown in Fig. 1. Such angularly disposed ties 6 are shown as at an acute angle to the length of the ribbon stock from which the blank is made.

Figure 3:
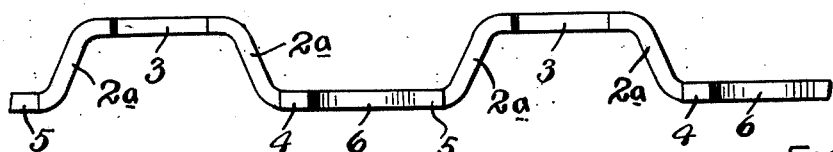
Fig. 3 is a fragmentary edge view of the completed expander and spacer, formed and shaped from the blank shown in Figs. 1 and 2.
Figure 4:
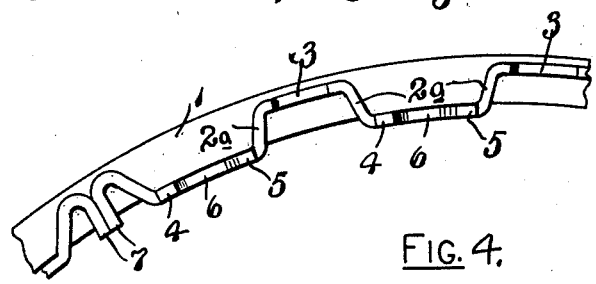
Fig. 4 is a fragmentary plan view of a piston ring, with the upper steel rail removed, showing the relation of the expander and spacer to said rails and also the parting of the expander and spacer at one side thereof.

The blank at each end is formed into a generally hook-like form, having two terminal end portions or sections 7 which will be radially disposed and abut against each other at the parting in the combined spacer and expander (Fig. 4). The blank is subjected to bending and other forming processes by bending the wider portions 2a of the sections 2 in the same direction away from the intermediate narrower or middle portion of the sections, the corrugated form which the device takes being shown in Figs. 3, 4 and 5. The completed blank is formed into a generally circular form so that the abutting ends 7 come together.

When thus constructed, one of the thin steel rails 1 may be located above such device and the other below it in a bottomless groove of a piston 8 (Fig. 6). As assembled with such rails, the projecting portions 4 and 5 are back of the inner curved edges of the rails. The angularly disposed portions 2a against the edges of which the upper rails 1 bear, extend outwardly and the intermediate connecting narrowed portion where the recesses 3 are made are located a short distance inwardly from the outer curved edges of the rails as shown in Figs. 4 and 5. When thus assembled the recesses at 3 furnish passages for oil to go through the ring and thus through the piston for return to the engine crankcase. Also oil will pass through the recesses at the sides of ties 6. When the assembled ring, having the spacer and expander of my invention, is installed in a cylinder, the circumferential dimension of the expander and spacer is such that in order to be installed the rails are substantially closed at their partings and the expander and spacer has the two abutments 7 come against each other and the expander and spacer is circumferentially compressed. The yield at the connecting ties 6 permits circumferential compression.

Because of the force generated by such circumferential compression, the expander and spacer member tending to return to its greater or normal circumferential dimension, brings the projections 4 and 5 against the inner edges of both rails, pushing them outwardly and causing them to bear with pressure against a cylinder wall.

There is thus provided a three-part oil ring, having the usual upper and lower rails and with a spacer between them, serving to exert the necessary force against the edges of the rails previously supplied by the fourth member of such type of oil rings, the corrugated thin metal tempered steel expander which is eliminated by use of my invention.

It is of course to be understood that minor variations in detail may be resorted to without departing from my invention, particularly in conjunction with the ties 6 which are not restricted to the exact form shown but may in many ways be varied so long as they exert an expanding force which is generated upon circumferential compression of the expander and spacer member. It is also apparent that, in addition to the vent passages made by the recesses 3, there are vent passages at the opposite sides of such ties 6 in the expander and spacer member when it is installed with the rails in a piston as shown in Fig. 6. A novel, practical, simpler and easier installed oil ring is provided by the construction which is shown and which is defined in the claims appended hereto.

I claim:
1. A spacer and expander piston ring element comprising, a parted, generally circular corrugated member of flat metal having alternate inner and outer corrugations integrally connected, each of said outer corrugations having an outer side adapted to extend vertically between two spaced rails, and each of said inner corrugations, having an inner side with end portions wider than the distance between the adjacent sides, said two rails, and a tie connection between said end portions resistingly yieldable in the direction of the circumference of said element, said element having abutments at the ends thereof at its parting adapted to bear against each other, whereby said element may be circumferentially compressed to smaller circumferential length.

2. A structure as described comprising, a parted generally circular corrugated member of flat ribbon, metallic, resistingly yieldable material adapted to be positioned between two generally horizontal thin, parted metallic, generally flat rails and hold them in spaced relation, having alternate outwardly and inwardly extended corrugations, each of the first mentioned corrugations having a flat generally vertically positioned outer side, narrower in width than the distance between the inner sides of said rails which are adapted to bear against the edges thereof, the second mentioned corrugations each having an inner side having end sections of a width greater than the distance between the adjacent sides of said rails, whereby said end sections are adapted to be located against the inner edges of said rails, and a narrow, integral tie connecting said end sections extending from one end section at one edge of the corrugated member to the other end section at the opposite edge of said member, said corrugated member at each of its ends, at the parting therein, having an abutment with generally radially position sides adapted to bear against each other.

3. A piston ring spacer and expander element adapted to space and press outwardly two spaced thin metallic rails comprising, a continuous length of flat metal yieldingly resistant to strain thereon, having a generally circular form and meeting ends abutting against each other, said length of metal having a plurality of successive sections, each comprising an intermediate portion of generally rectangular form and end portions at each end of the intermediate portion located at an angle thereto and extending generally in the same direction therefrom, and tie portions generally parallel to and spaced from the curved plane of said intermediate portions, each tie portion comprising ends of greater width than the said intermediate and end portions, and yielding ties connecting said ends, yieldingly resisting movement of said ends toward each other on circumferential compression to less than normal circumference of said element.

HOLLY M. OLSON.

References Cited in the file of this patent

UNITED STATES PATENTS

| Number | Name | Date |
|---|---|---|
| 2,387,084 | McFall | Oct. 16, 1945 |